United States Patent
Daniel

(10) Patent No.: US 9,050,676 B2
(45) Date of Patent: Jun. 9, 2015

(54) APPARATUS AND METHOD FOR STARTING ARC WELDING PROCESS

(75) Inventor: Joseph A Daniel, Sagamore Hills, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 452 days.

(21) Appl. No.: 13/411,471

(22) Filed: Mar. 2, 2012

(65) Prior Publication Data

US 2013/0228559 A1    Sep. 5, 2013

(51) Int. Cl.
  *B23K 9/10*   (2006.01)
  *B23K 9/067*  (2006.01)
  *B23K 9/12*   (2006.01)

(52) U.S. Cl.
  CPC .............. *B23K 9/0671* (2013.01); *B23K 9/125* (2013.01)

(58) Field of Classification Search
  CPC ................................ B23K 9/125; B23K 9/073
  USPC ........................................ 219/130.33, 130.21
  See application file for complete search history.

(56) References Cited

U.S. PATENT DOCUMENTS

| | | | |
|---|---|---|---|
| 4,195,216 A * | 3/1980 | Beauchamp et al. | 219/121.54 |
| 4,288,682 A * | 9/1981 | Toth | 219/137.71 |
| 6,034,350 A * | 3/2000 | Heraly et al. | 219/130.4 |
| 6,531,684 B2 * | 3/2003 | Rice et al. | 219/130.21 |
| 6,570,131 B1 * | 5/2003 | Stava | 219/130.4 |
| 6,794,608 B2 * | 9/2004 | Flood et al. | 219/130.51 |
| 6,963,048 B2 | 11/2005 | Huismann et al. | |
| 6,969,823 B2 | 11/2005 | Huismann et al. | |
| 6,984,806 B2 | 1/2006 | Huismann et al. | |
| 7,102,099 B2 | 9/2006 | Huismann et al. | |
| 7,138,602 B2 | 11/2006 | Huismann et al. | |
| 7,165,707 B2 | 1/2007 | Huismann et al. | |
| 7,323,659 B2 | 1/2008 | Ihde et al. | |
| 7,335,854 B2 | 2/2008 | Hutchison | |
| 7,351,933 B2 | 4/2008 | Huismann et al. | |
| 7,364,059 B2 | 4/2008 | Huismann et al. | |
| 7,554,056 B2 | 6/2009 | Huismann et al. | |
| 7,705,270 B2 * | 4/2010 | Norrish et al. | 219/137.71 |
| 2006/0070987 A1 * | 4/2006 | Daniel | 219/137.71 |
| 2006/0124622 A1 | 6/2006 | Hubinger et al. | |
| 2006/0226137 A1 | 10/2006 | Huismann et al. | |
| 2007/0056944 A1 | 3/2007 | Artelsmair | |
| 2007/0119840 A1 | 5/2007 | Flattinger et al. | |
| 2007/0158322 A1 | 7/2007 | Stieglbauer et al. | |
| 2007/0164074 A1 | 7/2007 | Schorghuber et al. | |
| 2007/0241161 A1 | 10/2007 | Kronegger et al. | |
| 2008/0156781 A1 | 7/2008 | Artelsmair et al. | |
| 2008/0314884 A1 * | 12/2008 | Fujiwara et al. | 219/130.51 |
| 2009/0026188 A1 | 1/2009 | Schorghuber | |
| 2009/0242534 A1 | 10/2009 | Artelsmair et al. | |
| 2012/0145690 A1 * | 6/2012 | Kawamoto et al. | 219/130.5 |
| 2012/0199567 A1 * | 8/2012 | Nakagawa et al. | 219/137 R |

* cited by examiner

*Primary Examiner* — Tu B Hoang
*Assistant Examiner* — Alba Rosario-Aponte
(74) *Attorney, Agent, or Firm* — Perkins Coie LLP

(57) ABSTRACT

A system and method of starting a welding operation is provided where an electrode is advanced towards a work piece in a pulsed fashion and having a voltage level which will provide a first current when contact between the electrode and the work piece is made. After contact the electrode is retracted so that a welding arc is established and after the welding arc is established the current and wire feed speed is increased to a welding level.

18 Claims, 5 Drawing Sheets

US 9,050,676 B2

APPARATUS AND METHOD FOR STARTING ARC WELDING PROCESS

BACKGROUND OF THE INVENTION

1. Field of the Invention

Devices, systems, and methods consistent with the invention relate to welding, and more specifically related to starting an arc welding process.

2. Description of the Related Art

When starting a welding application the welding electrode (or filler wire) can tend to spatter when the electrode makes contact with the work piece. This typically occurs because the welding current is started at the time contact is made between the electrode and the work piece. The spatter can cause defects in the weld joint. Accordingly, an improved arc starting method is desired.

BRIEF SUMMARY OF THE INVENTION

An exemplary embodiment of the present invention is a welding system and method for welding where the method includes advancing an electrode towards at least one work piece to be welded, where the advancement is pulsed between a first advancement rate and a second advancement rate and the first advancement rate is higher than the second advancement rate. A sensing voltage is provided to the electrode and a contact is detected between the electrode and the at least one work piece. Then a separation of the electrode from the at least one work piece is detected. After separation the pulsing of the electrode is stopped and the electrode is advanced toward the at least one work piece at a first fixed speed, and after separation a welding current is provided to the electrode to weld the at least one work piece.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
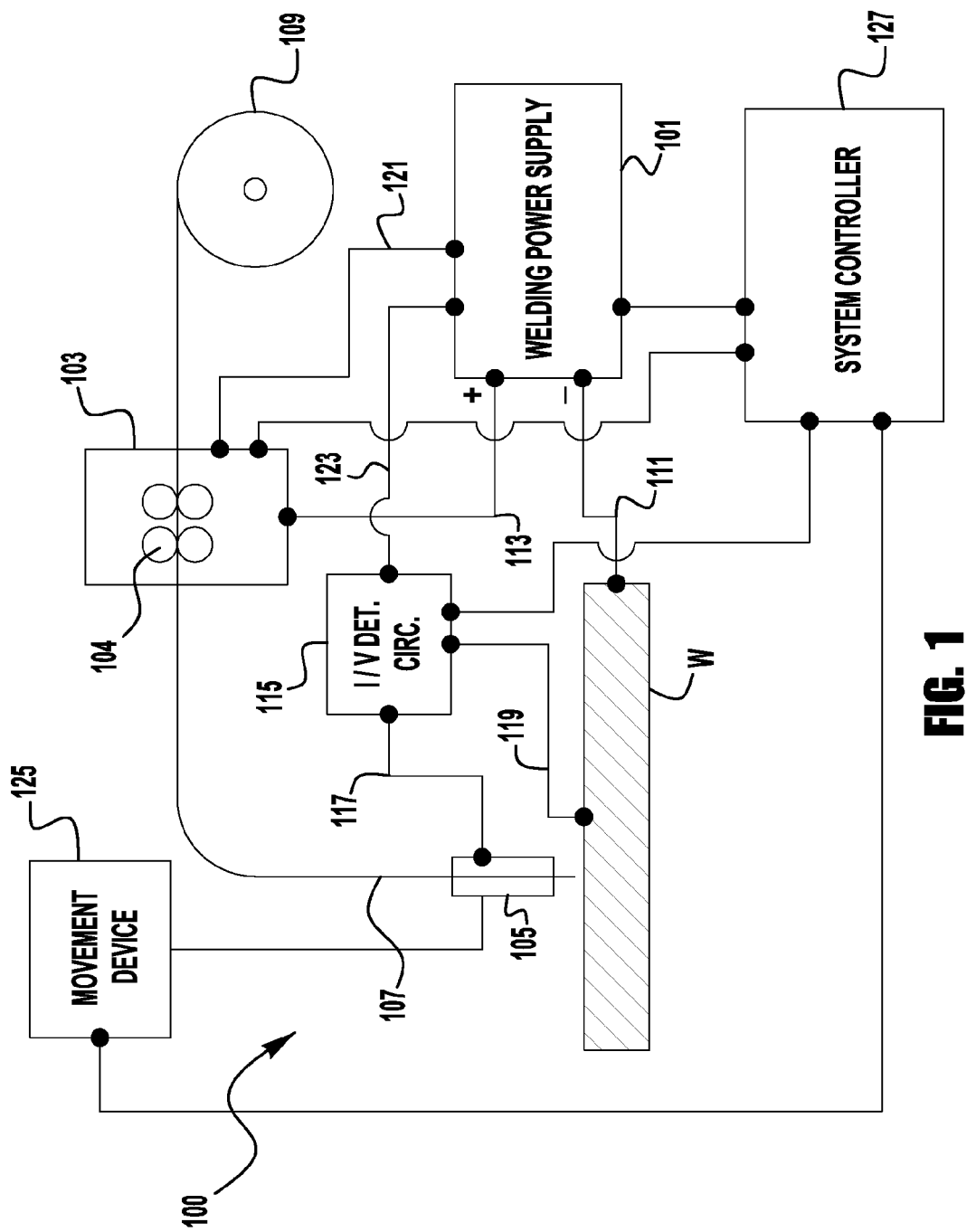
FIG. 1 illustrates a diagrammatical representation of a welding system in accordance with an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts an exemplary welding system 100 in accordance with an embodiment of the present invention. The system 100 comprises a welding power supply 101, a wire feeding mechanism 103, and a detection circuit 115 which can detect voltage, current, or both. The welding power supply 101 is coupled to a work piece W via a ground connection 111 and to the wire feeder 103 via a lead 113. It is noted that the leads 111 and 113 are shown as negative and positive respectively, however, this is not intended to limit embodiments of the present invention to DC welding, as the power supply 101 can perform AC or reverse polarity welding as well. The wire feeder mechanism 103 uses a lead (not shown) to provide a welding signal from the lead 113 to a welding torch 105. The welding signal is passed from the welding torch 105 to a welding electrode 107. The welding electrode 107 is drawn from a source 109 via rollers 104 in the wire feeding mechanism.

In an exemplary embodiment, the detection circuit 115 uses a lead 117 coupled to the torch 105 and a lead 119 coupled to the work piece W to sense the voltage between the welding electrode 105 and the work piece W, and the system uses leads 111 and 113 to sense the current. Such current and voltage sensing circuits are generally known. In other embodiments, the current can also be sensed by the circuit 115. The sensed current and/or voltage is transmitted to the welding power supply 101 via a lead 123, and a control lead 121 couples the wire feeding mechanism 103 to the power supply 101. Of course, if leads 111/113 are used to sense the current, the power supply 101 senses the current directly. The circuit 115 can be any type of circuit which is capable of detecting the real time voltage and/or current between the electrode 107 and the work piece W, and can be integral to the power supply 101 or the wire feeding mechanism 103. The circuit 115 is depicted as a separate component in FIG. 1 for clarity and is not required to be a separate component of the system 100. In fact, the circuit 115 can be the same circuit used by the power supply 101 to detect the real time welding current and/or voltage used for control the welding signal. The lead 123 communicates feedback information from the circuit 115 to the power supply 101 and the lead 121 allows the wire feeding mechanism 103 and the power supply 101 to communicate with each other to control the wire feeding and welding operations as needed.

Also shown in FIG. 1, in some embodiments, a robotic or semi-automatic movement device 125 moves and positions the torch 105 during welding. In other exemplary embodiments, the positioning of the torch 105 can be via semi-automatic welding operations via a user, and need not be a robotic welding device. In the embodiment shown, the device 125 positions the torch 105, and controls the movement of the torch 105 and/or work piece W, in accordance with a program stored in a system controller 127. Such components of a robotic or semi-automatic welding system are generally known and need not be described in detail herein. As shown, the system controller 127 can be coupled to the welding power supply 101 and wire feeding mechanism 103 to control their operation prior to and/or during welding. Further, the feedback from the circuit 115 can be provided directly to the system controller 127 to control the overall welding operation as described below.

As indicated previously, starting a welding operation can be difficult as spatter can be created when the initial welding arc is created. The following method, employing the above exemplary system 100, allows for the initiation of the welding operation without creating any significant spatter. FIGS. 2 through 5 depict various methods of starting an arc welding operation in accordance with exemplary embodiments of the present invention.

Figure 2:
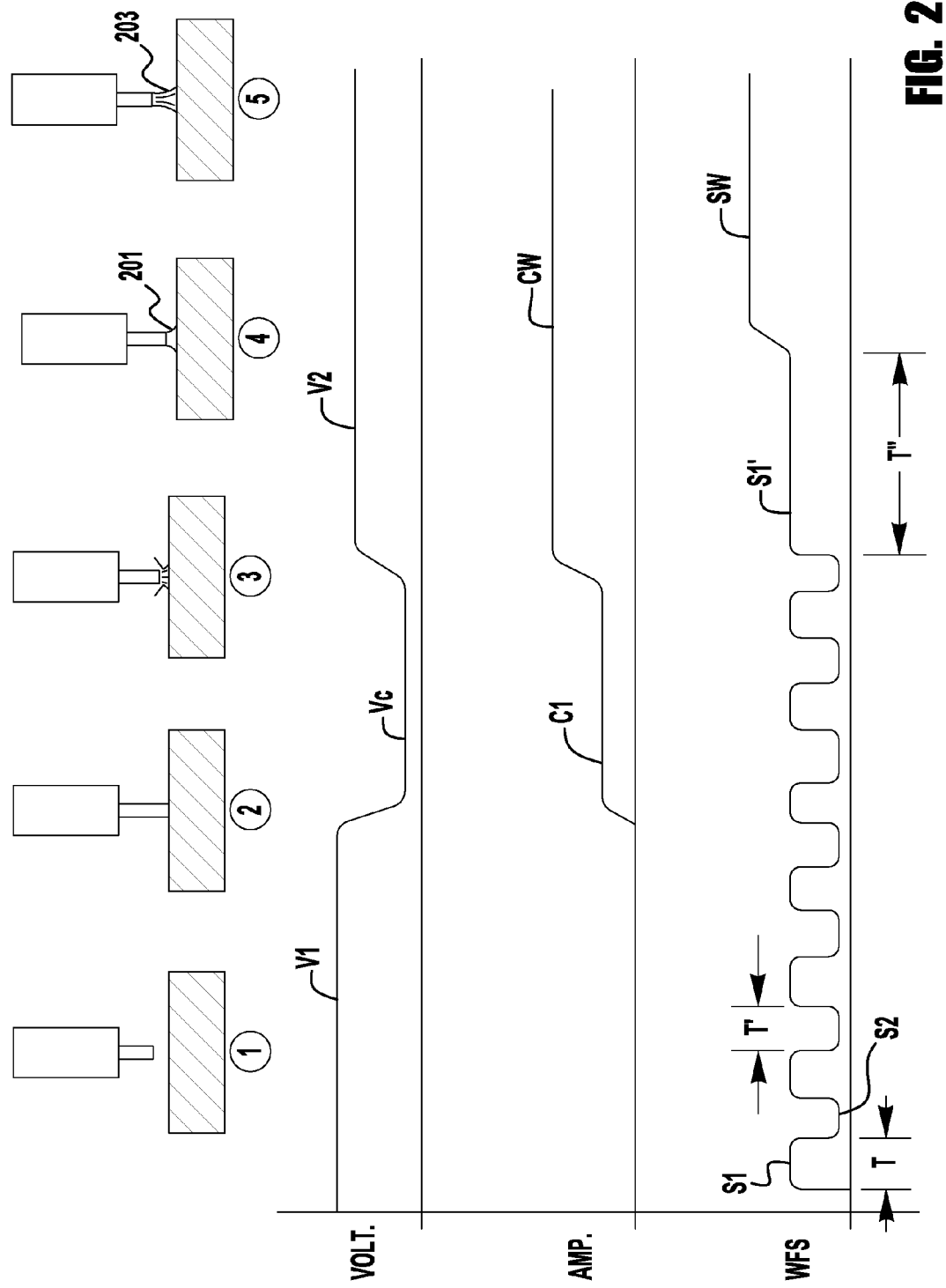
FIGS. 2 through 5 illustrate diagrammatical representations of weld starting operations in accordance with various embodiments of the present invention.

As shown in the FIG. 2, at the beginning of the operation the power supply 101 is providing and regulating a sensing voltage V1 to the wire 107. In an exemplary embodiment of the present invention, the voltage V1 is at least 10 volts. In further exemplary embodiments, the voltage is at least 15 volts, and in yet additional embodiments the voltage V1 is between 15 and 60 volts. Of course, other values can be utilized without departing from the spirit or scope of the present invention. Because there is no contact and no arc between the electrode 107 and the work piece W there is no current. Additionally (at Step 1) the electrode 107 is advanced toward the work piece W in a pulsed fashion. That is, the electrode 107 is advanced at a first speed S1 for a period of time T and then advanced at a second speed for a period of time T'. In some embodiments the times T and T' can be the same, while in other exemplary embodiments the time T is longer in duration, and in further exemplary embodiments the time T' is longer in duration. This pulsing can be achieved in a number of different ways. For example, the wire feeder 103 can feed the wire at speed S1 for the time T and then stop feeding for time T', but since there will be some compressive forces existing in the wire after the initial pulse the wire 107 will still advance at speed S2, as the wire relaxes. Alternatively, during the time T' the wire feeder 103 can simply be feeding the wire 107 at a second speed S2. Thus, in some exemplary embodiments the wire feeding mechanism 103 pulses the wire feeding by start and stopping the wire feeding mechanism 103, while in other exemplary embodiments the pulsing can be from one feed speed to another feed speed by the wire feeder 103. Thus, for example, during the feeding pulse the speed of the feeding of the electrode 107 is at a first level S1 for a period T and then at a second speed S2 for the time T', which is less than the speed S1. The electrode 107 is fed/pulsed by the wire feeding mechanism 103 such that the electrode makes contact with the work piece W (Step 2). The pulsing of the electrode 107 can be controlled in a number of different ways, including feeding the electrode at a set speed S1 for a period of time T, or the wire feeding mechanism can be controlled by advancing the electrode 107 a set distance for each pulse, at a set rate S1. Because contact is made, the voltage between the electrode 107 and the work piece W drops to nearly zero and the current will begin to flow.

When the wire 107 makes contact with the work piece W (Step 2) the detection circuit 115 detects either the flow of current and/or the drop in voltage to a contact level Vc and provides that feedback to the power supply 101 and/or system controller 127. In some exemplary embodiments, the voltage contact level Vc is set at 2 volts, such that when the voltage reaches 2 volts, or below, the controller 127 and/or power supply 101 determines that contact has been made. In other exemplary embodiments of the present invention, the voltage contact level Vc can be set at 1 volt. Of course, other values can be utilized without departing from the spirit or scope of the present invention.

Now that contact has been made a first current C1 is provided through the wire 107 and into the work piece W, which is less than an arc welding current level. That is, the current level C1 is at a level such that although a small arc can be created between the wire 107 and the work piece W the current is not so high that arc welding begins. In exemplary embodiments of the present invention the current level C1 is no more than 20 amps. In another exemplary embodiment of the present invention, the level C1 is no more than 10 amps. In a further exemplary embodiment, the current level C1 is in the range of 10 to 20 amps. Of course, other values can be utilized without departing from the spirit or scope of the present invention.

In some embodiments, once contact has been made the power supply 101 switches from a voltage regulation mode (which is used to regulate the wire voltage V1 prior to wire 107 contact) to a current regulation mode to regulate the current level C1. Such regulation circuitry is known and need not be described in detail herein. In other exemplary embodiments, the power supply 101 can continue to use voltage regulation techniques with a current limit ability to ensure that the current C1 is maintained at the desired level C1.

After contact (as shown at step 3) the wire 107 rebounds. Stated differently, because of the pulsing nature of the wire feeding operation the wire 107 essentially bounces off of the work piece W after it makes contact with the work piece W. This bounce or rebound occurs because of the inherent flex in the wire 107 that results from the pulsing of the wire 107. That is, as the wire 107 is being pulsed it is being repeatedly compressed and relaxed within its wire delivery system. Because the bounce or rebound of the wire 107 breaks the contact between the wire 107 and the work piece W the voltage begins to rise again to a rebound voltage level V2. This rebound voltage level V2 is less than the initial voltage level V1 (because current is now flowing) and higher than the contact voltage level Vc. In exemplary embodiments, the rebound voltage level V2 is at least 5 volts, while in other exemplary embodiments, the rebound voltage level V2 is at least 8 volts. In further embodiments the rebound voltage level V2 is in the range of 5 to 8 volts. Of course, other values can be utilized without departing from the spirit or scope of the present invention. Further, the rebound voltage level V2 may or may not be the regulated voltage level for welding.

This rebound voltage level V2 is detected by the detection circuit 115 which communicates the detected voltage to at least one of the controller 127 and power supply 101, and the power supply 101 uses this information to begin the welding operation. Thus, as the rebound voltage level V2 is reached the power supply 101 provides a welding current CW, which can be the current used for a desired welding operation. The welding current CW will be higher than the current C1. In some embodiments of the present invention, the current CW can be the same as a background current level, as used in a GMAW-pulse type welding waveform for a welding operation. For example, if a GMAW-pulse welding waveform is to be used for welding having a background level of 60 amps, the current level CW will be set at 60 amps.

Additionally, after the detection of the rebound voltage V2 the wire feeding mechanism 103 is signaled to stop pulsing the feeding of the wire and feed the wire continuously at a second speed S1'. In some exemplary embodiments, the second speed S1' can be the same as the initial speed S1, but it is not pulsed. Additionally, in these embodiments the second speed S1' is used for a period T'" to allow for the initial arc 201 to be created and stabilized, after which the wire is fed at a welding speed SW which is the speed for the desired welding operation. The initial arc 201 is essentially the initiation of a final welding arc and has sufficient energy to begin melting at least one of the work piece and the wire 107 for welding. As shown at Step 5 the full welding arc 203 is present and the welding operation is occurring. In alternative embodiments, the second speed S1' is higher than the speed S1, and can be the speed at which the welding operation is to be conducted (SW).

At step 5 the welding arc 203 is fully established and the welding operation proceeds as desired at the desired current, voltage and wire feed speed levels. Of course, the welding operation can be any type of welding operations, including but not limited to pulsed, non-pulsed, MIG, GMAW, SAW, FCAW, etc. Embodiments of the present invention are not limited by the type of welding waveform employed during the welding operation.

Figure 3:
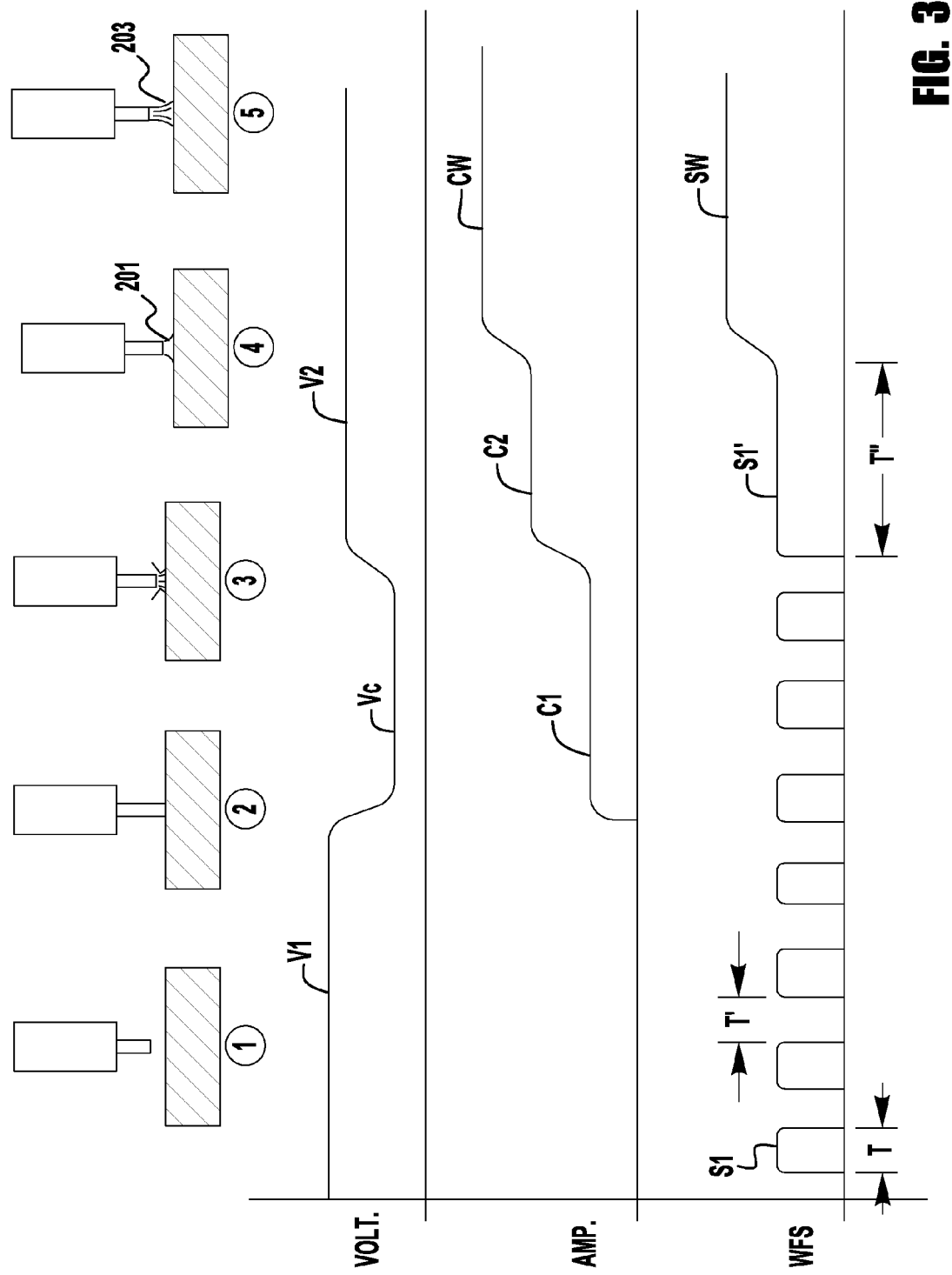

FIG. 3 depicts another exemplary starting method which is similar to that shown in FIG. 2. However, in this embodiment an intermediate current level C2 is initiated after the rebound (Step 3) and prior to the initiation of the welding current CW. This intermediate current C2 is used to establish the initial arc 201 and is at a level above the initial current C1 and below the welding current CW. This intermediate current C2 is used during the time period T" at which time the wire is fed at the speed S1' which is less than the welding speed SW and is equal to or higher than the initial pulse speed S1. Additionally, in this embodiment the wire 107 is not fed during the time T' between pulses such that the wire 107 essentially stops between pulses.

Figure 4:
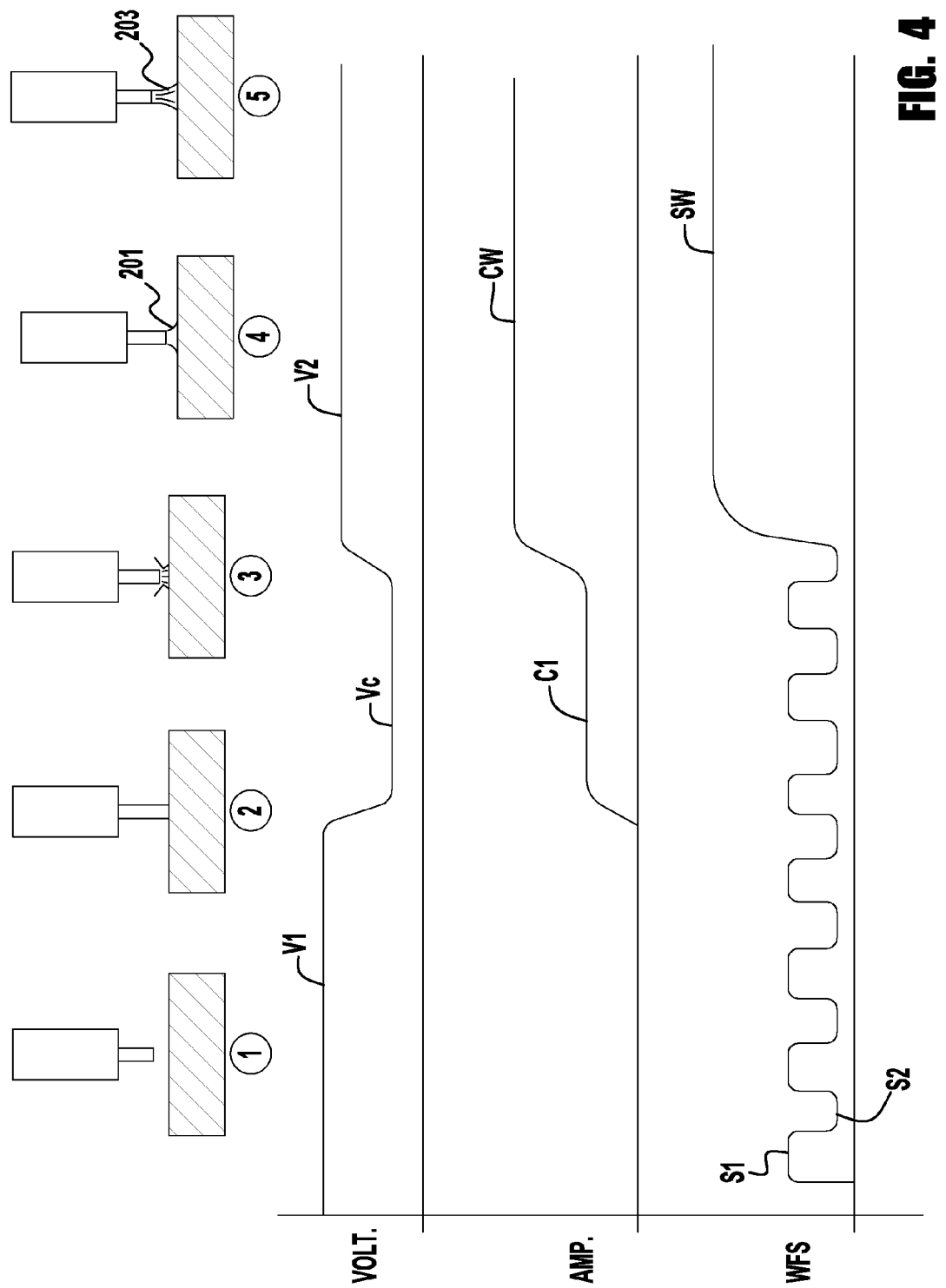

FIG. 4 depicts another exemplary embodiment which is similar to FIG. 2. However, in this embodiment the wire feed speed is increased to the welding wire feed speed level SW after the rebound voltage V2 and/or welding current CW is reached by the power supply 101. Thus, in this embodiment there is no intermediate wire feed speed S1' and the wire feed speed is fed at the welding speed SW once the rebound is detected.

Figure 5:
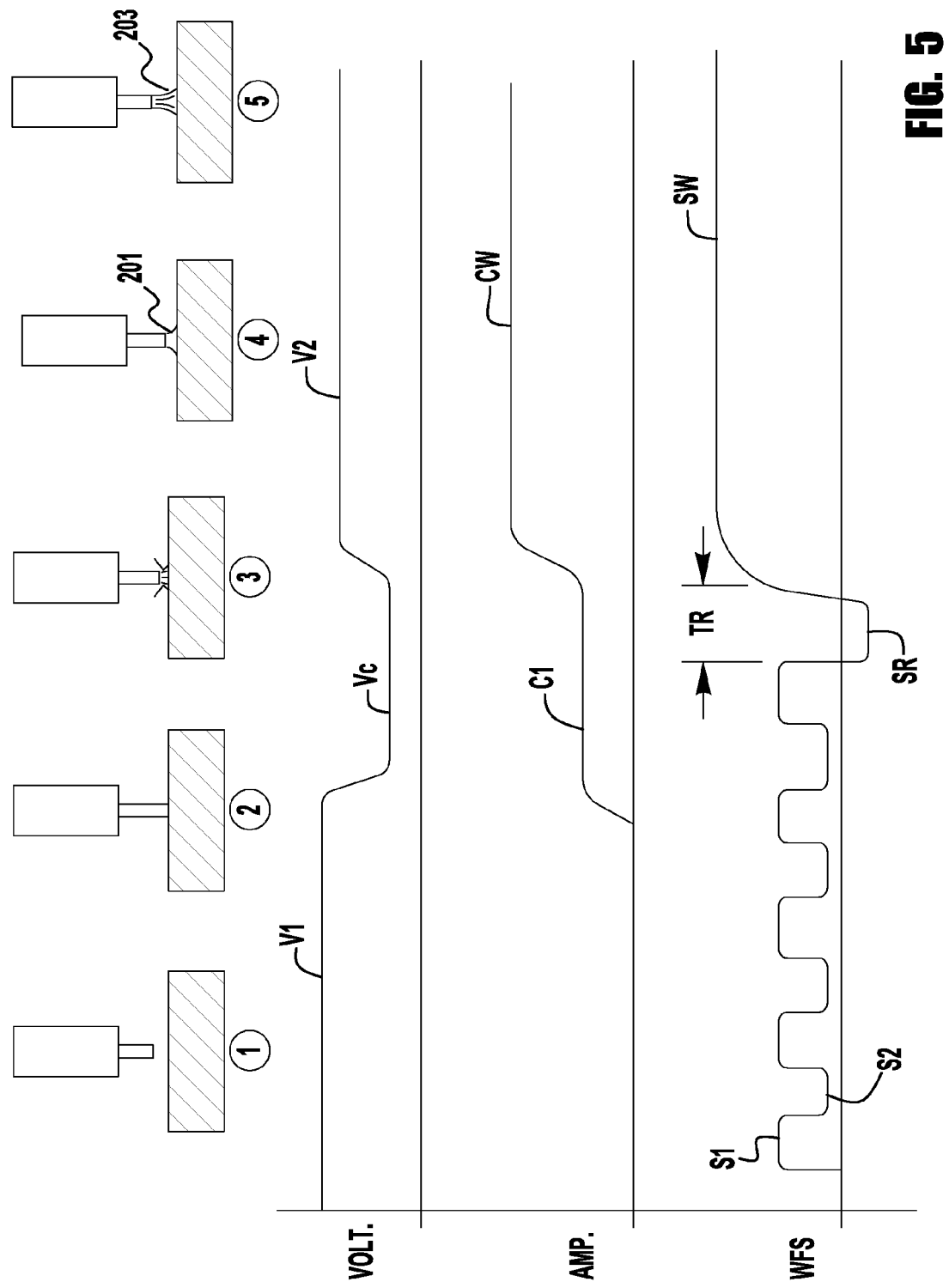

FIG. 5 depicts another exemplary embodiment of the present invention. Again, many aspects of the starting method are similar to the other figures. However, in this embodiment the wire 107 is retracted by the wire feeder 103 after contact is detected. Thus, after the wire contact is detected the wire feeder 103 is instructed to retract or reverse the wire 107. This can be accomplished in a number of ways. For example, in some embodiments the wire feeder 103 can be instructed to retract the wire 107 at a reverse speed SR for a period of time TR. Alternatively, the wire feeder 103 can be instructed to retract the wire 107 a predetermined distance. Then, after the wire is retracted and the appropriate voltage and/or current levels are detected the welding operation can begin. Although FIG. 5 depicts that the welding current CW and welding wire feed speed SW are reached after retraction, like the embodiment shown in FIG. 3 an intermediate current and wire feed speed level can be utilized without departing from the spirit and scope of the present invention.

In an exemplary embodiment of the present invention, the control implemented by the system controller 127 and/or power supply 101, and any other control electronics used, are high speed control electronics. The use of high speed control electronics allows for the rapid control of the system to ensure rapid establishment of the arc 201 after contact is made between the electrode 107 and the work piece W. In an exemplary embodiment of the present invention, the system controller 127 controls the power supply 101 and the wire feeding mechanism 103 such that the timing between contact of the electrode 107 with the work piece W (step 2) and the start of the arc 201 (step 4) is in the range of 20 to 50 µs. In another embodiment, the timing is in the range of to 30 to 40 µs. With this timing an arc can be established quickly with minimal or no spatter, unlike prior arc starting methods. In another embodiment of the present invention, the above timing is the timing between contact of the electrode 107 with the work piece W (step 2) and the time at which the wire feeding mechanism starts feeding the electrode at the welding wire feed speed SW.

In the embodiments described above, the controller 127 and/or the power supply 101 utilize the detected voltage and/or current levels to control the starting method. However, other exemplary embodiments can use other detection methods without departing from the scope or spirit of the present invention. For example, embodiments of the present invention can monitor the rate of voltage change dv/dt and the rate of current change di/dt, in place of the voltage and current detection, respectively, described above. That is, by monitoring the rate of change of the voltage and/or current the controller 127 and power supply 101 can implement the starting methods described above. Such embodiments can use voltage and/or current premonition circuits such that the same control methodology described above is employed. The construction and utilization of such circuit types are generally known and need not be described in detail herein.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A method of welding, comprising:
   advancing an electrode towards at least one work piece to be welded, where said advancement is pulsed between a first advancement rate and a second advancement rate, where said first advancement rate is higher than said second advancement rate;
   providing a sensing voltage to said electrode at an initial voltage; detecting a contact between said electrode and said at least one work piece;
   detecting a separation of said electrode from said at least one work piece by detecting a rebound voltage, which is less than the initial voltage;
   stopping said pulsing of said electrode after detecting said separation;
   after said stopping of said pulsing, advancing said electrode toward said at least one work piece at a first fixed speed; and
   after said detection of said separation, providing a welding current to said electrode to weld said at least one work piece,
   wherein said electrode is advanced at said first fixed speed for a first duration and after said first duration said electrode is advanced at a second fixed speed which is different than said first fixed speed; and
   wherein after said detection of said separation an intermediate current is provided to said electrode before said welding current is provided to said electrode, where said intermediate current is less than said welding current.

2. The method of claim 1, wherein said advancement is pulsed at said first advancement rate for a first duration and at said second advancement rate for a second duration, where said first and second durations are not the same.

3. The method of claim 1, wherein said sensing voltage is at least 10 volts.

4. The method of claim 1, wherein said detecting of said contact between said electrode and said at least one work piece comprises at least one of detecting a voltage and detecting a current between said electrode and at least one work piece.

5. The method of claim 1, wherein said detecting of said contact between said electrode and said at least one work piece comprises determining when a contact voltage between said electrode and said at least one work piece is at or below a contact voltage level.

6. The method of claim 5, wherein said contact voltage level is no more than 2 volts.

7. The method of claim 1, further comprising providing a post-contact current to said electrode after said detection of said contact, where said post-contact current is less than said welding current.

8. The method of claim 7, wherein said post-contact current is no more than 20 amps.

9. The method of claim 1, wherein said detection of said separation comprises monitoring a voltage between said electrode and said at least one work piece and said separation is determined when said voltage reaches or exceeds a rebound voltage level.

10. The method of claim 9, wherein said rebound voltage level is less than said sensing voltage.

11. The method of claim 9, wherein said rebound voltage is at least 5 volts.

12. The method of claim 1, wherein said second fixed speed is faster than said first fixed speed.

13. The method of claim 1, wherein said first fixed speed of said electrode is the same as said first advancement rate of said electrode.

14. The method of claim 1, further comprising providing a post-contact current to said electrode after said detection of said contact until said separation is detected, where said intermediate current is larger than said post-contact current and less than said welding current.

15. The method of claim 1, further comprising reversing a direction of said electrode for a reversing duration after detection of said contact.

16. The method of claim 1, wherein said first fixed speed is a welding speed for said electrode.

17. The method of claim 1, wherein said intermediate current is provided for said first duration, and after said first duration said electrode is provided at a said second fixed speed and said welding current is provided.

18. A welding system, comprising:
a power supply which provides a sensing voltage to a welding electrode at an initial voltage;
a wire feeding mechanism which advances said welding electrode towards at least one work piece; and
a detection circuit which detects at least one of a voltage and current between said welding electrode and said at least one work piece;
wherein said wire feeding mechanism advances said welding electrode using a plurality of wire feed speed pulses, where said pulses have a first wire feed speed rate for a first duration and a second wire feed speed rate for a second duration;
wherein said detection circuit detects a contact between said welding electrode and said at least one work piece and detects a separation of said welding electrode and said at least one work piece by detecting a rebound voltage, which is less than the initial voltage; and
wherein after said detection circuit detects said separation, said wire feeding mechanism advances said welding electrode at a first fixed speed and said power supply provides a welding current to said welding electrode,
wherein said wire feeding mechanism advances said welding electrode at said first fixed speed for a first duration and after said first duration said wire feeding mechanism advances said welding electrode at a second fixed speed which is different than said first fixed speed; and
wherein after said detection circuit detects said separation said power supply provides an intermediate current to said electrode before said power supply provides said welding current to said electrode, where said intermediate current is less than said welding current.

* * * * *